(12) United States Patent
Fukui

(10) Patent No.: US 10,809,953 B2
(45) Date of Patent: Oct. 20, 2020

(54) INFORMATION PROCESSING APPARATUS FOR CONTROLLING INTERRUPT JOB AND NON-TRANSITORY COMPUTER READABLE MEDIUM STORING PROGRAM

(71) Applicant: FUJI XEROX CO., LTD., Tokyo (JP)

(72) Inventor: Takeshi Fukui, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/531,117

(22) Filed: Aug. 4, 2019

(65) Prior Publication Data

US 2020/0301638 A1    Sep. 24, 2020

(30) Foreign Application Priority Data

Mar. 20, 2019   (JP) .................................. 2019-053404

(51) Int. Cl.
*H04N 1/32*        (2006.01)
*G06F 3/12*        (2006.01)

(52) U.S. Cl.
CPC .......... *G06F 3/1263* (2013.01); *G06F 3/1206* (2013.01); *G06F 3/1259* (2013.01); *G06F 3/1282* (2013.01)

(58) Field of Classification Search
CPC .... G06F 3/1263; G06F 3/1206; G06F 3/1259; G06F 3/1282; G06F 9/4843
See application file for complete search history.

(56) References Cited

U.S. PATENT DOCUMENTS

| | | | |
|---|---|---|---|
| 2008/0063423 A1* | 3/2008 | Matoba | G03G 15/50 399/76 |
| 2014/0078548 A1* | 3/2014 | Kikuchi | G06F 3/1203 358/1.15 |
| 2016/0034229 A1* | 2/2016 | Yamaguchi | H04N 1/0032 358/1.13 |

FOREIGN PATENT DOCUMENTS

| | | |
|---|---|---|
| JP | 2005267176 | 9/2005 |
| JP | 2015-223760 | 12/2015 |
| JP | 2016-087876 | 5/2016 |

\* cited by examiner

*Primary Examiner* — Iriana Cruz
(74) *Attorney, Agent, or Firm* — JCIPRNET

(57) ABSTRACT

An information processing apparatus includes a control unit that performs control such that performs control such that a second job for which no deadline is set is executed in a case where the second job is received while a first job for which a deadline is set is being executed and the deadline of the first job is not missed even in a case where the second job is executed.

14 Claims, 9 Drawing Sheets

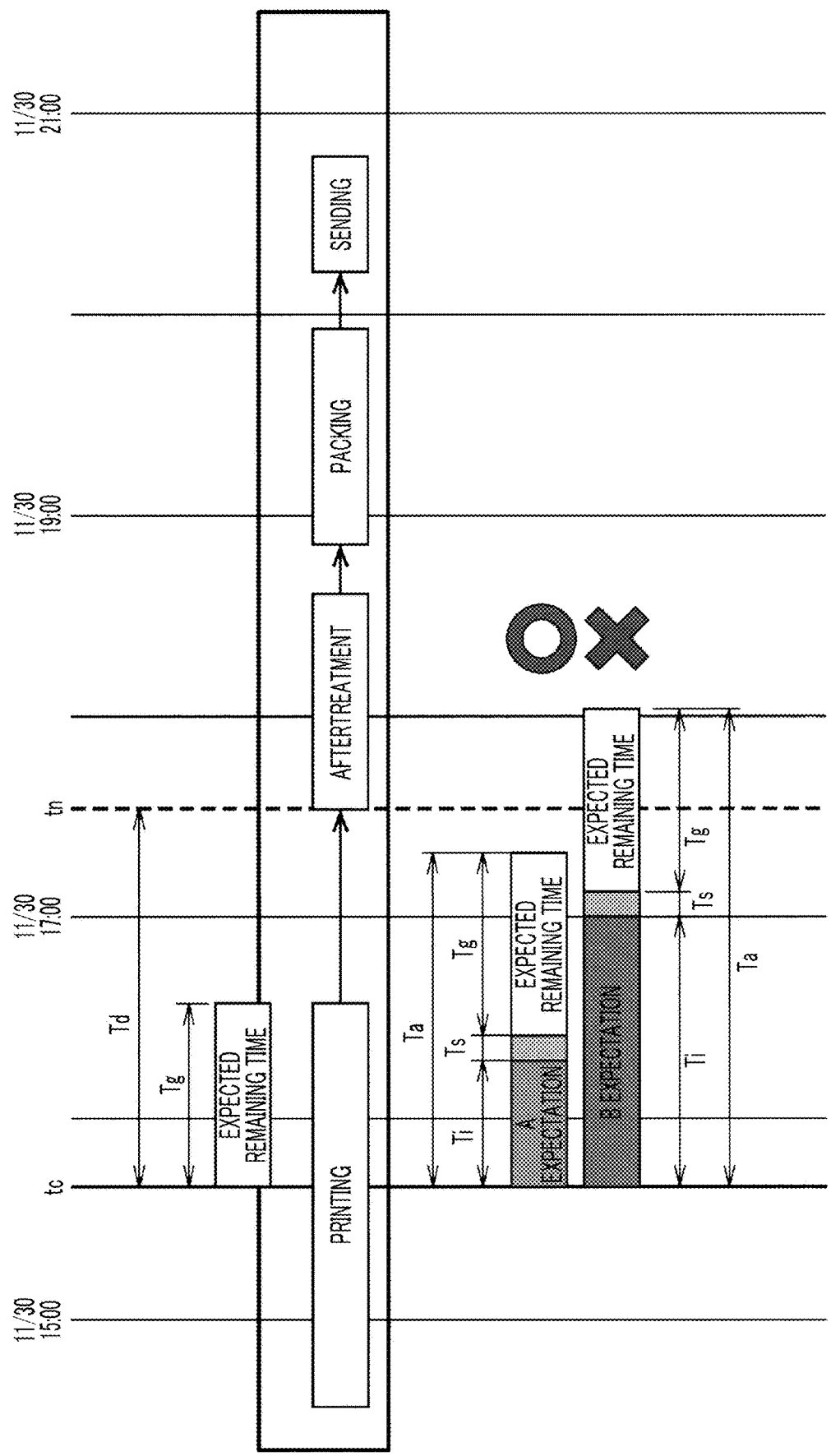

FIG. 4A

```
┌─────────────────────────┐
│ THIS JOB IS NOT FINISHED│
│ UNTIL DEADLINE OF JOB   │
│ WHICH IS PRINTING, THUS │
│ IT IS NOT POSSIBLE TO   │
│ EXECUTE INTERRUPT       │
│ PRINTING.               │
│                         │
│ DEADLINE: 12/03/2018 16:00
│ EXPECTATION: 12/03/2018 16:30
│ (+30MINUTES)            │
│                         │
│              [ YES ]───221a
└─────────────────────────┘
            221
```

FIG. 4B

```
┌─────────────────────────┐
│ IT IS DISCHARGED TO SAME│
│ DISCHARGE DESTINATION   │
│ WITH JOB WHICH IS       │
│ PRINTING. WOULD YOU LIKE│
│ TO CHANGE DISCHARGE     │
│ DESTINATION OF INTERRUPT│
│ PRINTING JOB?           │
│                         │
│ BEFORE CHANGE: STACKER TRAY 1
│ AFTER CHANGE: [STACKER TRAY 1 ▼]──222a
│                         │
│   [ NO ]      [ YES ]   │
│     │            │      │
│   222c         222b     │
└─────────────────────────┘
            222
```

FIG. 4C

```
┌─────────────────────────┐
│ IT IS DISCHARGED TO SAME│
│ DISCHARGE DESTINATION   │
│ WITH JOB WHICH IS       │
│ PRINTING. WOULD YOU LIKE│
│ TO CHANGE DISCHARGE     │
│ DESTINATION OF INTERRUPT│
│ PRINTING JOB?           │
│                         │
│ BEFORE CHANGE: STACKER TRAY 1
│ AFTER CHANGE: [STACKER TRAY 1 ▼]──222a
│        ┌──────────────────┐
│        │ FINISHER DISCHARGE│
│        │ TRAY              │
│        │ STACKER DISCHARGE │
│        │ TRAY 1            │
│        │ STACKER DISCHARGE │
│        │ TRAY 2            │
│        │ FINISHER TRAY     │
│        │ STACKER TRAY 2    │
│        └──────────────────┘
└─────────────────────────┘
            222
```

FIG. 4D

```
┌─────────────────────────┐
│ IT IS DISCHARGED TO SAME│
│ DISCHARGE DESTINATION   │
│ WITH JOB WHICH IS       │
│ PRINTING. WOULD YOU LIKE│
│ TO EXECUTE FORCIBLE     │
│ INTERRUPT PRINTING?     │
│                         │
│ DISCHARGE DESTINATION:  │
│ STACKER TRAY 1          │
│                         │
│   [ NO ]      [ YES ]   │
│     │            │      │
│   223b         223a     │
└─────────────────────────┘
            223
```

FIG. 4E

```
┌─────────────────────────┐
│ IT IS NOT POSSIBLE TO   │
│ EXECUTE INTERRUPTING JOB│
│ SINCE DISCHARGE         │
│ DESTINATIONS ARE SAME AS│
│ JOB WHICH IS PRINTING.  │
│                         │
│ DISCHARGE DESTINATION:  │
│ STACKER TRAY 1          │
│                         │
│              [ YES ]──224a
└─────────────────────────┘
            224
```

FIG. 4F

```
┌─────────────────────────┐
│ INTERRUPT PRINTING IS   │
│ FINISHED. PLEASE EXTRACT│
│ PRINTED MATTER AND PRESS│
│ START BUTTON OF PRINTER │
│                         │
│ DISCHARGE DESTINATION:  │
│ STACKER TRAY 1          │
│                         │
│              [ YES ]──225a
└─────────────────────────┘
            225
```

FIG. 4G

```
┌─────────────────────────┐
│ START BUTTON OF PRINTER │
│ IS PRESSED. JOB WHICH IS│
│ STOPPED BY INTERRUPT    │
│ PRINTING IS RESTARTED.  │
│                         │
│              [ YES ]──226a
└─────────────────────────┘
            226
```

INFORMATION PROCESSING APPARATUS FOR CONTROLLING INTERRUPT JOB AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-053404 filed Mar. 20, 2019.

BACKGROUND

(i) Technical Field

The present invention relates to an information processing apparatus and a non-transitory computer readable medium storing a program.

(ii) Related Art

In recent years, a printing system that enables interrupt printing during mass printing has been proposed (for example, refer to JP2005-267176A).

A printing system described in JP2005-267176A is a printing system in which a default priority is set for a mass printing job, an interrupting job is executed with a process being stopped after a process up to the end of a page is finished in a case where a priority set for the interrupting job is higher than the priority set for the mass printing job and a job in progress is an image drawing job on the page, and the interrupting job is executed after the mass printing job is finished in a case where the priority set for the mass printing job is higher than the priority set for the interrupting job.

SUMMARY

In a case where a small-quantity interrupting job for which no deadline is set is executed after a large-quantity job for which a deadline is set is finished, the small-quantity interrupting job for which no deadline is set cannot be executed until the large-quantity job for which the deadline is set is finished. Therefore, the small-quantity interrupting job is finished late. Meanwhile, in a case where the small-quantity interrupting job for which no deadline is set is executed in the middle of the large-quantity job for which the deadline is set, the deadline of the large-quantity job for which the deadline is set may not be met.

Aspects of non-limiting embodiments of the present disclosure relate to an information processing apparatus and a non-transitory computer readable medium storing a program with which it is possible to perform control in which a job for which no deadline is set is executed such that a deadline for another job for which the deadline is set is not missed in a case where the job transmitted while the other job is being executed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a control unit that performs control such that a second job for which no deadline is set is executed in a case where the second job is received while a first job for which a deadline is set is being executed and the deadline of the first job is not missed even in a case where the second job is executed.

BRIEF DESCRIPTION OF THE DRAWINGS

Exemplary embodiment (s) of the present invention will be described in detail based on the following figures, wherein:

FIG. 3 is a schematic view illustrating an example of a printing schedule of a group job in a chronological manner;

FIGS. 4A to 4G are diagrams illustrating examples of a pop-up screen;

DETAILED DESCRIPTION

Figure 1:
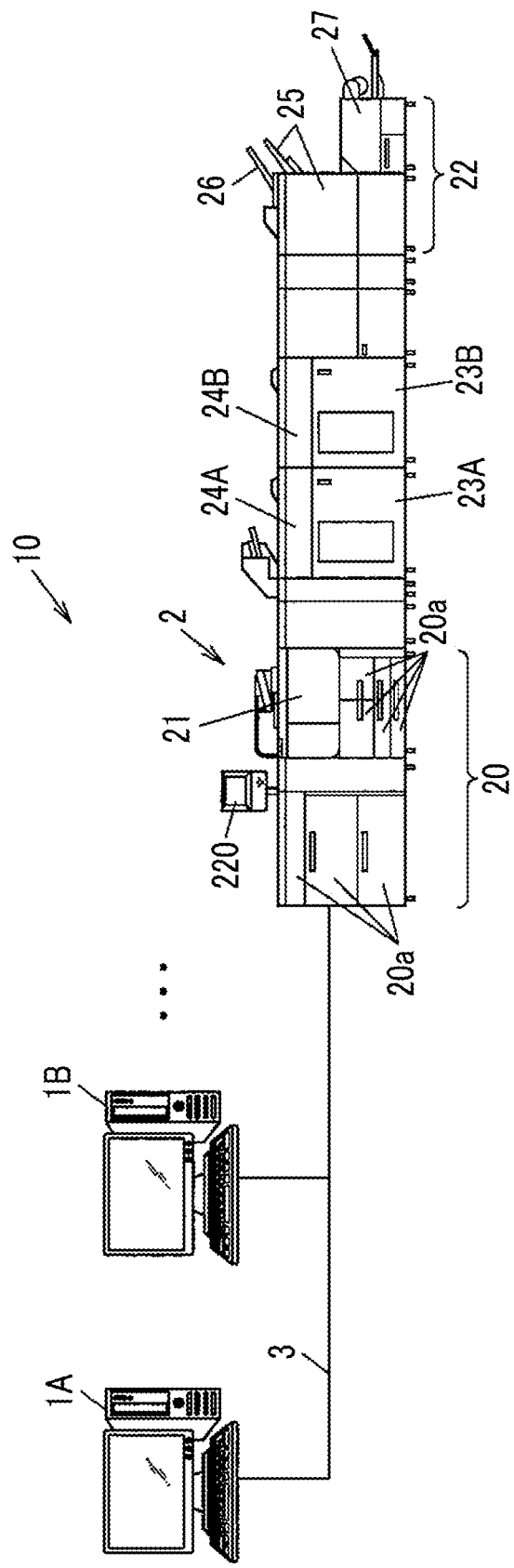
FIG. 1 is a diagram illustrating an example of the configuration of a printing system according to an exemplary embodiment of the present invention.

Hereinafter, an exemplary embodiment of the present invention will be described with reference to drawings. Note that, in the drawings, components having the substantially same functions are given the same reference numerals and repetitive description thereof will be omitted.

Summary of Exemplary Embodiment

An information processing apparatus according to the exemplary embodiment includes a control unit that performs control such that a second job for which no deadline is set is executed in a case where the second job is received while a first job for which a deadline is set is being executed and the deadline of the first job is not missed even in a case where the second job is executed.

Exemplary Embodiment

FIG. 1 is a diagram illustrating an example of the configuration of a printing system according to the exemplary embodiment of the present invention. A printing system 10 is provided with a first terminal 1A, a plurality of second terminals 1B, and a printer 2 that is connected to the first terminal 1A and the second terminals 1B via a network 3. Note that, the number of the second terminals 1B may be one. The printer 2 is an example of the information processing apparatus.

The network 3 is, for example, a communication network such as a local area network (LAN) or an intranet.

The printer 2 has a function as a production printer performing production printing. The production printing refers to mass printing or printing including aftertreatment such as cutting and bookbinding.

The first terminal 1A and the second terminals 1B are realized by, for example, computers. The first terminal 1A uses the printer 2 as a projection printer and workflow software (hereinafter, referred to as workflow SW) is installed in the first terminal 1A to cause the printer 2 to execute production printing. The second terminals 1B use the printer 2 as an office machine.

The workflow SW is software for managing the operation state or the printing schedule of the printer 2. By means of the workflow SW, for example, a combination of a plurality of jobs (hereinafter, referred to as group job) is transmitted to the printer 2. In this case, the workflow SW creates and manages a printing schedule of the group job. The group job is an example of the first job.

FIG. 3 is a schematic view illustrating an example of the printing schedule of the group job in a chronological manner. The group job includes a plurality of jobs of performing a printing process, an aftertreatment process, a packing process, a sending process, and the like. In a printing job, for example, a plurality of items of printing data, which are different from each other in sending destination but are the same as each other in sheet type, are collectively printed on paper sheets. In the printing job, for example, a process of discharging printed matters to discharge destinations pre-set in the workflow SW is performed after the printing. In an aftertreatment job, for example, aftertreatment such as cutting, bookbinding, and stapling is performed.

With regard to the printing schedule of the group job, intervals at which no process is performed are provided between the plurality of jobs. The "interval" means a time between when one job constituting the group job is finished and when execution of the next job is started. In FIG. 3, the printing job, the aftertreatment job, a packing job, and a sending job constitute the group job. An interval between the printing job and the aftertreatment job is longer than other intervals. The printing job included in the group job may include, for example, a plurality of items of printing data, which are different from each other in sending destination, as a processing target. In this case, intervals shorter than the intervals between the jobs are present between respective printing processes for the sending destinations even during the printing job. Note that, the intervals during the printing job are not limited to intervals between the respective printing processes for the sending destinations.

The second terminals 1B can transmit a job (hereinafter, referred to as interrupting job) to the printer 2 while the printer 2 is executing the group job. The interrupting job is a job of performing printing and discharging a printed matter to a pre-set discharge destination, for example. Note that, the interrupting job may include an aftertreatment process such as cutting and bookbinding. The interrupting job is an example of the second job. The printed matter is an example of a processing result.

Configuration of Printer 2

The printer 2 is provided with a paper feeding unit 20 that feeds a paper sheet to a printing unit 21, an aftertreatment unit 22 that performs aftertreatment on a paper sheet (also referred to as printed matter) subjected to printing performed by the printing unit 21, and a plurality of discharge destinations to which a paper sheet on which the printing has been performed is discharged. The paper feeding unit 20 is provided with a plurality of paper feeding trays 20a.

Examples of the discharge destinations of the printer 2 include a first stacker tray 23A of which the tray name is "stacker tray 1", a second stacker tray 23B of which the tray name is "stacker tray 2", a first stacker discharge tray 24A of which the tray name is "stacker discharge tray 1", a second stacker discharge tray 24B of which the tray name is "stacker discharge tray 2", a finisher tray 25, a finisher discharge tray 26, and an external finisher 27.

The first stacker tray 23A, the second stacker tray 23B, and the finisher tray 25 are configured such that a large number of printed matters can be accumulated thereon. The first stacker discharge tray 24A, the second stacker discharge tray 24B, and the finisher discharge tray 26 are configured such that a small number of printed matters can be accumulated thereon. The discharge trays 24A, 24B, and 26 (hereinafter, referred to as top tray group) are disposed in an upper portion of the printer 2. The top tray group is an example of one of the plurality of discharge destinations at which a user more easily handles printed matters than the other of the plurality of discharge destinations.

Figure 2:
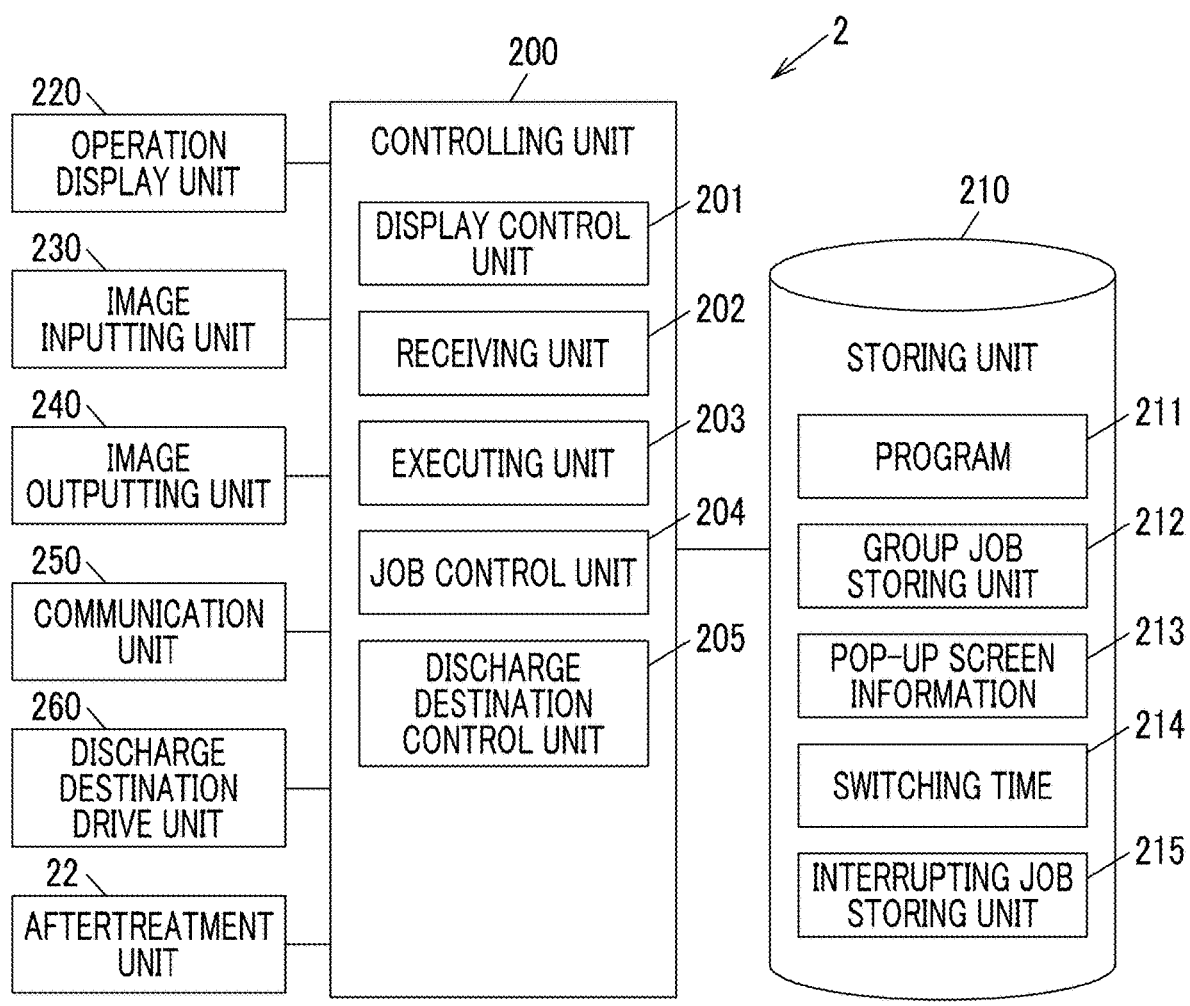
FIG. 2 is a block diagram illustrating an example of a control system of a printer.

FIG. 2 is a block diagram illustrating an example of a control system of the printer 2. The printer 2 is provided with a controlling unit 200 that controls each part of the printer 2, a storing unit 210 that stores various information, an operation display unit 220, an image inputting unit 230, an image outputting unit 240, a communication unit 250, a discharge destination drive unit 260, and the aftertreatment unit 22.

The controlling unit 200 is composed of a central processing unit (CPU), an interface, and the like. The CPU functions as a display control unit 201, a receiving unit 202, an executing unit 203, a job control unit 204, a discharge destination control unit 205, or the like by executing the program 211. The units 201 to 205 will be described later. The display control unit 201, the executing unit 203, the job control unit 204, and the discharge destination control unit 205 are an example of a control unit.

The storing unit 210 is composed of a read only memory (ROM), a random access memory (RAM), a hard disk, and the like and includes the program 211, a group job storing unit 212, pop-up screen information 213, a switching time 214, an interrupting job storing unit 215, and the like. The switching time 214 is an example of a job switching time.

In the group job storing unit 212, the group job and in-process information of the group job are stored. The group job includes setting information (for example, printing paper sheet, discharge destination, next step starting date and time, or like) and printing data. The next step starting date and time is a date and time at which a next time is started after one job constituting the group job is finished. The next step starting date and time is an example of the deadline. Note that, the example of the deadline is not limited to the next step starting date and time and a time at which a process (for example, printing process) constituting a job (for example, printing job) is finished may be set. The group job is stored by the receiving unit 202. The in-process information of the group job includes the number of sheets printed in the group job in progress, the number of pages, or the like. The in-process information of the group job is stored by the job control unit 204.

The pop-up screen information 213 includes pop-up screens 221 to 226 (refer to FIGS. 4A to 4G) which are displayed on the operation display unit 220 in a case where the display control unit 201 performs display control.

The switching time 214 is the sum of a time required for a process of the interrupting job to be started after the job control unit 204 cancels the group job and a time required for the group job to be restarted after the interrupting job is finished. The switching time 214 is determined depending on the performance of the printer 2.

In the interrupting job storing unit 215, the interrupting job received by the receiving unit 202 is stored. The interrupting job includes setting information (for example, number of sheets to be printed, number of pages, discharge destination, or like) and printing data. In a case where the interrupting job is executed, the printing data is printed on a paper sheet based on the setting information and a printed matter is discharged to a designated discharge destination.

The operation display unit 220 has a configuration in which, for example, a touch panel is polymerization-disposed onto a display such as a liquid crystal display. The operation display unit 220 displays various screens on a display screen and receives a user's operation on the touch panel.

The image inputting unit 230 is provided with, for example, a scanner and an automatic document feeding device and reads an image from a document disposed on a document table or a document fed from the automatic document feeding device.

The image outputting unit 240 forms and outputs an image on a recording medium such as a paper sheet by means of an electrophotographic technique, an inkjet technique, or the like.

The communication unit 250 performs control related to the network and receives the group job and the interrupting job transmitted from the first and second terminals 1A and 1B via the network 3.

The discharge destination drive unit 260 is provided with a guiding member and actuators such as motors or solenoids operating the guiding member, and the discharge destination drive unit 260 switches printed matter discharge destinations based on control performed by the discharge destination control unit 205. The discharge destination drive unit 260 switches the printed matter discharge destinations by driving actuators disposed at discharge destinations such that the orientation of the guiding member is changed.

The aftertreatment unit 22 performs the aftertreatment process including cutting, bookbinding, and stapling on a printed matter produced in the printing unit 21, based on control performed by the discharge destination control unit 205.

Next, each of the units 201 to 205 of the controlling unit 200 will be described.

The display control unit 201 reads the pop-up screens 221 to 226 included in the pop-up screen information 213, causes the operation display unit 220 to display the pop-up screens 221 to 226, and receives the contents of an operation performed with respect to the pop-up screens 221 to 226.

The receiving unit 202 receives the group job and the interrupting job from the first terminal 1A and the second terminals 1B. The receiving unit 202 acquires a next step starting date and time tn from the group job.

The executing unit 203 executes the group job and the interrupting job. The executing unit 203 may perform control such that the group is restarted after extraction of the processing result of the interrupting job is detected by a photosensor or the like in a case where the discharge destination of the group job and the discharge destination of the interrupting job are the same as each other. In addition, the executing unit 203 may not perform the interrupting job in a case where the discharge destination of the group job and the discharge destination of the interrupting job are the same as each other. In this case, for example, the executing unit 203 preferably causes the operation display unit 202 to display to the effect that the interrupting job is not performed or notify the second terminals 1B that the interrupting job is not performed such that a user is notified that the interrupting job is not performed.

The job control unit 204 calculates an expected remaining time Tg to completion of printing in the group job from the number of sheets to be printed which is included in setting information of the printing job. In addition, the job control unit 204 calculates an expected remaining time Ti between the start of an interrupt printing process based on the interrupting job and completion of printing, from the number of sheets to be printed which is included in the setting information of the interrupting job. In addition, the job control unit 204 acquires the switching time 214 from the storing unit 210 as a switching time Ts. The expected remaining time to completion of printing in the group job refers to an expected time between when the interrupting job is received and when the printing in the group job is finished. The expected remaining time between the start of the interrupt printing process and completion of printing refers to an expected time between the start of the interrupt printing process and completion of printing. The expected remaining time Tg is an example of a remaining execution time of the first job. The expected remaining time Ti is an example of an execution time of the second job.

The job control unit 204 calculates a total time Ta (refer to FIG. 3) from the acquired time and the calculated time, based on the following Equation (1).

$$Ta = Ti + Ts + Tg \quad (1)$$

Ti: expected remaining time between start of interrupt printing process and completion of printing Ts: switching time Tg: expected remaining time to completion of printing in group job The job control unit 204 acquires a time, at which the receiving unit 202 receives the interrupting job (that is, current time tc), from the receiving unit 202, acquires the next step starting date and time tn from the group job, and calculates a difference Td (refer to FIG. 3) between the next step starting date and time tn and the current time tc based on the following Equation (2).

$$Td = tn - tc \quad (2)$$

tn: next step starting date and time tc: current time

The job control unit 204 determines whether there will be an influence of the interrupting job on the printing schedule of the group job based on whether the total time Ta and the difference Td satisfy the following Equation (3) or not.

$$Td > Ta \quad (3)$$

Td: difference between next step starting date and time tn and current time tc

Ta: total time

That is, in a case where the above-described Equation (3) is satisfied (for example, in case where expected remaining time Ti is as in case of expectation A in FIG. 3), the job control unit 204 determines that it is possible to execute the interrupting job since the interrupting job does not influence the printing schedule of the group job. In a case where the above-described Equation (3) is not satisfied (for example, in case where expected remaining time Ti is as in case of expectation B in FIG. 3), it is determined that it is not possible to execute the interrupting job since the interrupting job influences the printing schedule of the group job.

In a case where the interrupting job is received while the group job is being executed and printing up to an interval during the printing job included in the group job is finished, the job control unit 204 cancels the group job in progress, stores the in-process information such as the number of printed sheets until the interval during the printing job and the number of pages in the group job storing unit 212, performs control such that an interrupt printing process or a forcibly performed interrupt printing process (hereinafter, referred to as forcible interrupt printing process) which will be described later is executed, reads the in-process information such as the number of printed sheets during the group job and the number of pages from the group job storing unit 212 after the interrupt printing process is finished, and performs control such that the group job is restarted based on the information. The interrupt printing process refers to a printing process that is executed in an interrupting manner while the printing job in the group job is not being executed. The forcible interrupt printing process refers to a printing process that is executed in an interrupting manner while the printing job in the group job is being executed.

The discharge destination control unit 205 determines the discharge destination of a printed matter produced through the group job based on the group job and reads and determines the discharge destination of a printer matter produced through the interrupting job from the interrupting job storing unit 215. The discharge destination control unit 205 controls the discharge destination drive unit 260.

In a case where the discharge destination of the printed matter produced through the group job and the discharge destination of the printed matter produced through the interrupting job are the same as each other, the discharge destination control unit 205 executes a discharge destination determination process, which will be described later. The discharge destination control unit 205 controls the discharge destination of the group job and the interrupting job based on the result of the discharge destination determination process.

In a case where the discharge destination of the group job and the discharge destination of the interrupting job are the same as each other, the discharge destination control unit 205 may perform control such that the discharge destination of the interrupting job is changed. In this case, for example, the discharge destination of the interrupting job is preferably one of the plurality of discharge destinations which a user more easily extracts than the other of the plurality of discharge destinations. In addition, for example, the discharge destination control unit 205 preferably causes the operation display unit 202 to display the changed discharge destination or transmit the changed discharge destination to the second terminals 1B such that a user is notified of the changed discharge destination. The discharge destination control unit 205 may cause the changed discharge destination to be displayed in a display mode different from those of the other discharge destinations. In addition, in a case where the discharge destination of the group job and the discharge destination of the interrupting job are the same as each other, the discharge destination control unit 205 may cause the operation display unit 202 to display completion of the interrupting job or transmit the completion of the interrupting job to the second terminals 1B such that a user is notified of the completion of the interrupting job.

Operation of Exemplary Embodiment

Figure 5:
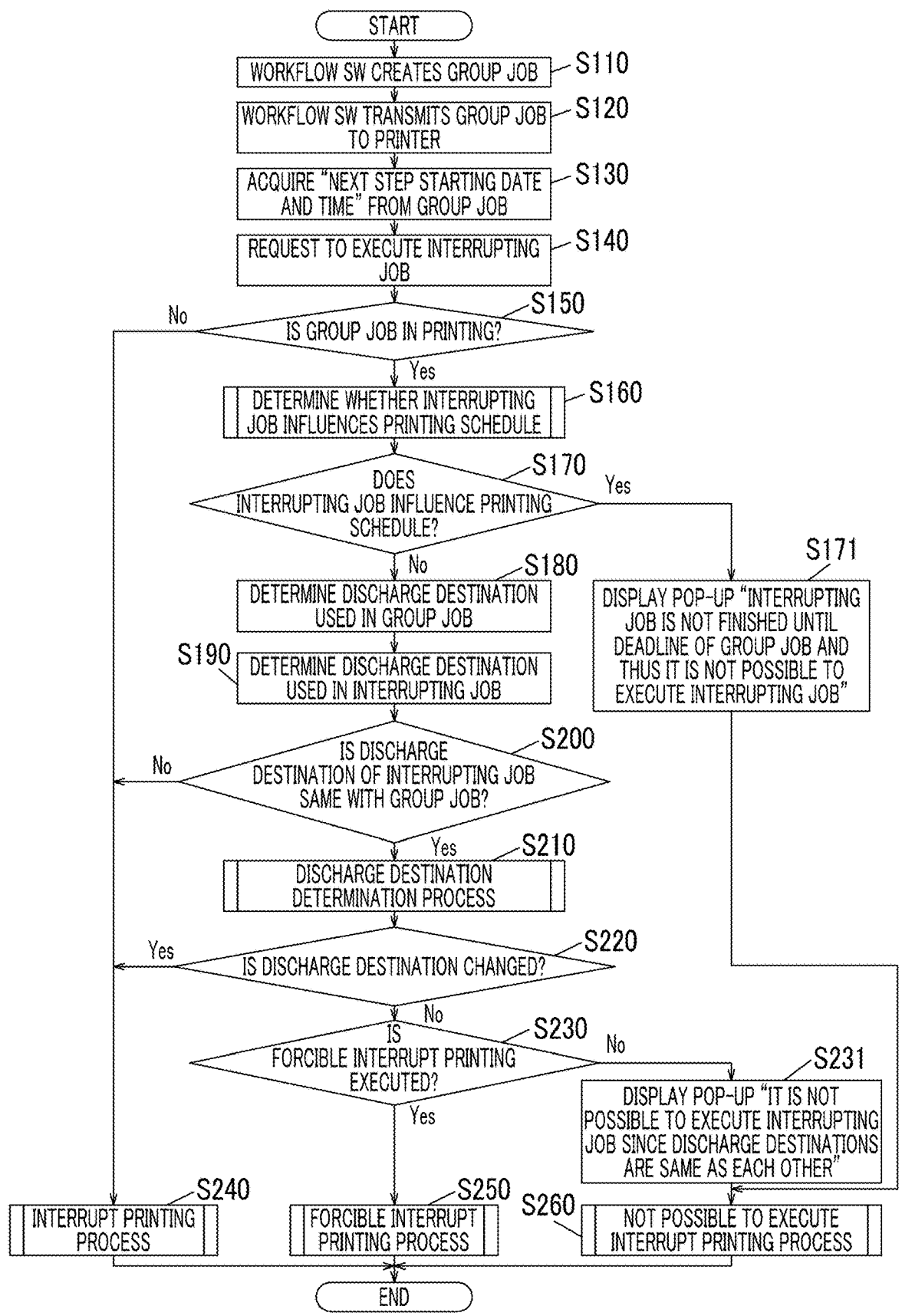
FIG. 5 is a flowchart illustrating an example of an operation of the printing system according to the exemplary embodiment.

Next, an example of the operation of the printing system 10 will be described with reference to FIGS. 4A to 9. FIG. 5 is a flowchart illustrating an example of the operation of the printing system 10.

The first terminal 1A activates the workflow SW to create a group job for executing production printing (S110).

The first terminal 1A transmits the group job to the printer 2 via the network 3 (S120).

The receiving unit 202 of the printer 2 receives the transmitted group job, stores the group job in the group job storing unit 212, and acquires the next step starting date and time to from the group job (S130).

The executing unit 203 of the printer 2 starts to execute the group job. The discharge destination control unit 205 determines the discharge destination of a printed matter produced through a printing job of the executing unit 203 based on the group job and controls the discharge destination drive unit 260 based on the result of the determination.

The second terminals 1B transmit an interrupting job to the printer 2 via the network 3 (S140).

The receiving unit 202 receives the interrupting job, stores the interrupting job in the interrupting job storing unit 215, and determines whether a printing process included in the group job is in progress or not (S150). In a case where the printing process included in the group job is not in progress (S150: No), the executing unit 203 executes an interrupt printing process based on the interrupting job (S240). The operation of the interrupt printing process will be described later by using FIG. 8.

In a case where the printing process included in the group job is in progress (S150: Yes), the job control unit 204 determines whether the interrupting job influences the printing schedule of the group job (S160). The details of the determination will be described later by using FIG. 6.

In a case where the job control unit 204 determines that the interrupting job influences the printing schedule of the group job and thus it is not possible to execute the interrupting job (S170: Yes), the display control unit 201 reads the pop-up screen 221 (refer to FIG. 4A) from the pop-up screen information 213 and causes the operation display unit 220 to display the pop-up screen 221 (S171).

FIG. 4A is a diagram illustrating an example of the pop-up screen 221 indicating that "the interrupting job is not finished until the deadline of the group job in a case where the interrupting job is executed and thus it is not possible to execute the interrupting job". The pop-up screen 221 includes a "yes" button 221a. In a case where the "yes" button 221a is operated, the executing unit 203 continues the group job (S260).

In a case where the job control unit 204 determines that the interrupting job does not influence the printing schedule of the group job and thus it is possible to execute the interrupting job (S170: No), the discharge destination control unit 205 determines the discharge destination of the group job based on information stored in the group job storing unit 212 (S180). The discharge destination control unit 205 reads and determines the discharge destination from the interrupting job stored in the interrupting job storing unit 215 (S190).

The job control unit 204 determines whether the discharge destination of the group job and the discharge destination of the interrupting job are the same as each other or not (S200). In a case where the discharge destinations are not the same as each other (S200: No), the executing unit 203 starts to execute the interrupt printing process which will be described later (S240) and restarts the group job after the interrupt printing process is finished.

In a case where the discharge destinations are the same as each other (S200: Yes), the discharge destination control unit 205 executes the discharge destination determination process (S210). The details of the discharge destination determination process will be described later using FIG. 7.

After the discharge destination determination process is finished (S210), the display control unit 201 reads the pop-up screen 222 (refer to FIGS. 4B and 4C) from the pop-up screen information 213 and causes the operation display unit 220 to display the pop-up screen 222.

FIGS. 4B and 4C are diagrams illustrating an example of the pop-up screen 222 with which a discharge destination 222a of the interrupting job is selected in a case where the discharge destination of the group job and the discharge destination of the interrupting job are the same as each other. The pop-up screen 222 includes a "discharge destination selection" button 222a, a "yes" button 222b, and a "no" button 222c. In a case where the "discharge destination selection" button 222a is operated, a pull-down menu is displayed as shown in FIG. 4C such that the discharge destination of the interrupting job can be selected. Note that, the top tray group, which a user more easily extracts than the other of discharge destinations that are displayed by means of the pull-down menu in a case where the "discharge destination selection" button 222a is operated, may be highlighted in blue or other colors.

In a case where the "yes" button 222b in the pop-up screen 222 is operated (S220: Yes), the discharge destination control unit 205 controls the discharge destination drive unit 260 such that the discharge destination of a printed matter printed through the interrupting job is changed to a discharge destination selected by means of the "discharge destination selection" button 222a. The executing unit 203 starts to execute the interrupt printing process which will be described later (S240) and restarts the group job after the interrupt printing process is finished.

In a case where the "no" button 222c in the pop-up screen 222 is operated (S220: No), the display control unit 201 reads the pop-up screen 223 (refer to FIG. 4D) from the pop-up screen information 213 and causes the operation display unit 220 to display the pop-up screen 223 (S230).

FIG. 4D is a diagram illustrating an example of the pop-up screen 223 with which whether to start to execute the forcible interrupt printing process or not is selected. The pop-up screen 223 includes a "yes" button 223a and a "no" button 223b. In a case where the "no" button 223b is operated (S230: No), the display control unit 201 reads the pop-up screen 224 (refer to FIG. 4E) indicating that "it is not possible to execute the interrupting job since the discharge destinations are the same as each other" from the pop-up screen information 213 and causes the operation display unit 220 to display the pop-up screen 224.

FIG. 4E is a diagram illustrating an example of the pop-up screen 224 indicating that "it is not possible to execute the interrupting job since the discharge destinations are the same as each other". The pop-up screen 224 includes a "yes" button 224a. In a case where the "yes" button 224a is operated, the executing unit 203 continues the group job (S260).

In a case where the "yes" button 223a in the pop-up screen 223 is operated (S230: Yes), the executing unit 203 starts to execute the forcible interrupt printing process (S250). The contents of the forcible interrupt printing process will be described later by using FIG. 9. After the forcible interrupt printing process is finished, the executing unit 203 restarts the group job.

Process of Determining Whether Printing Schedule Is Influenced

Figure 6:
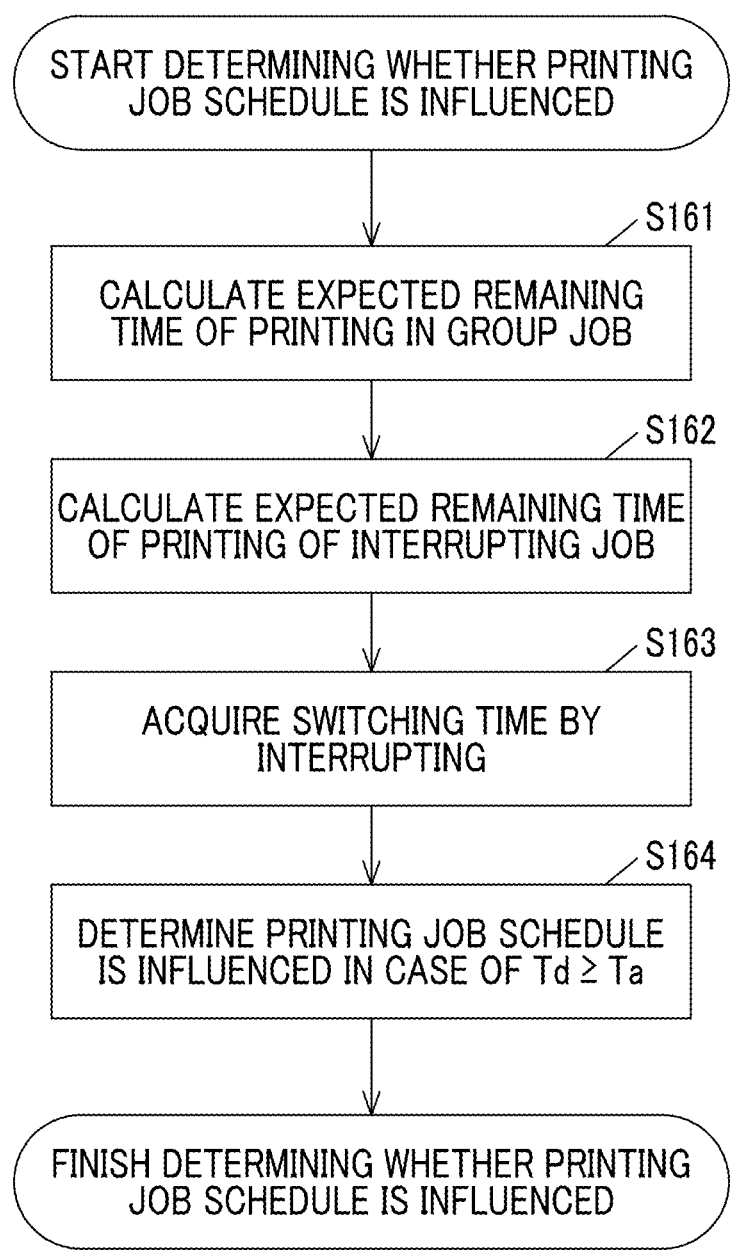
FIG. 6 is a flowchart illustrating the details of step S160 in the flowchart shown in FIG. 5.

FIG. 6 is a flowchart illustrating the details of step S160 shown in FIG. 5.

The job control unit 204 calculates the expected remaining time Tg to completion of printing in the group job in progress (S161), calculates the expected remaining time Ti between when the start of the interrupt printing process (S240) and completion of printing (S162), and reads the switching time 214 from the storing unit 210 as the switching time Ts (S163).

The job control unit 204 calculates the total time Ta by adding up the expected remaining time Tg, the expected remaining time Ti, and the switching time Ts, acquires the current time tc from the receiving unit 202, and calculates the difference Td=tn−tc between the next step starting date and time tn acquired in step S130 and the current time tc.

The job control unit 204 determines whether the interrupt printing process (S240) influences the printing schedule of the group job or not based on the total time Ta and the difference Td (S164). That is, in a case where the total time Ta exceeds the difference Td=tn−tc between the next step starting date and time tn and the current time tc (Td<Ta), it is determined that the interrupt printing process influences the printing schedule of the group job and thus it is not possible to execute the interrupting job. In a case where the total time Ta is equal to or shorter than the difference Td, it is determined that the interrupt printing process does not influence the printing schedule of the group job.

Discharge Destination Determination Process (S210)

Figure 7:
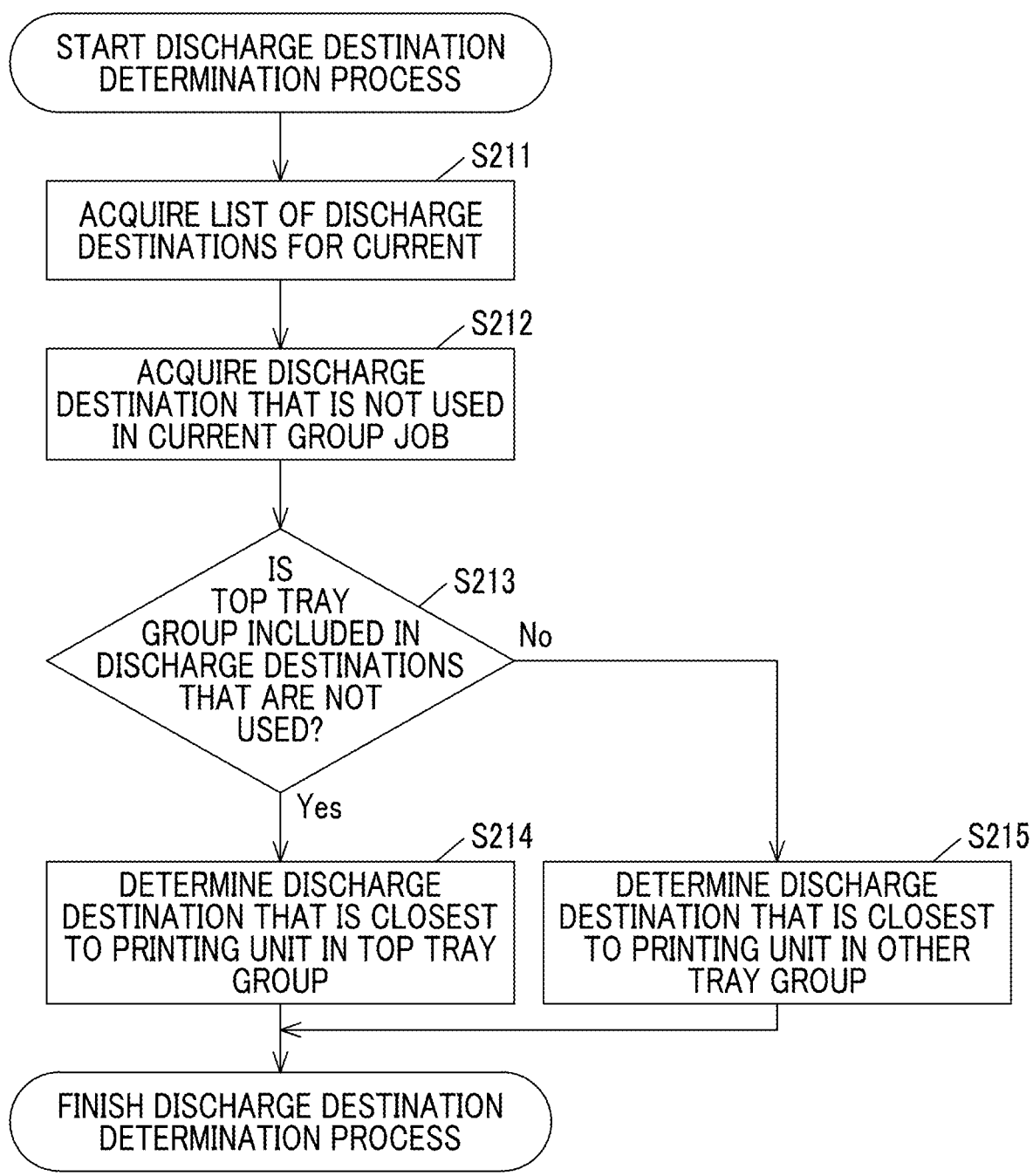
FIG. 7 is a flowchart illustrating the details of step S210 in the flowchart shown in FIG. 5.

FIG. 7 is a flowchart illustrating the details of step S210 in the flowchart shown in FIG. 5.

The discharge destination control unit 205 acquires a list of discharge destinations for the current group job from the executing unit 203 (S211) and acquires discharge destinations that are not used in the current group job (S212).

The discharge destination control unit 205 determines whether the discharge destinations that are not used in the group job include the top tray group or not (S213). In a case where the discharge destinations that are not used in the group job include the top tray group (S213: Yes), the discharge destination control unit 205 determines a discharge destination that is closest to the printing unit 20 in the top tray group not to be used in the group job, as the discharge destination of the interrupt printing process (S240) or the forcible interrupt printing process (S250) (S214). In a case where the discharge destinations that are not used in the group job include the top tray group (S213: No), the discharge destination control unit 205 determines a discharge destination that is closest to the printing unit 20 in the other tray group not to be used in the group job, as the discharge destination of the interrupt printing process (S240) or the forcible interrupt printing process (S250) (S215). The first stacker tray 23A, the second stacker tray 23B, the finisher tray 25, and the external finisher 27 constitute the other tray group, for example.

Operation in Interrupt Printing Process (S240)

Figure 8:
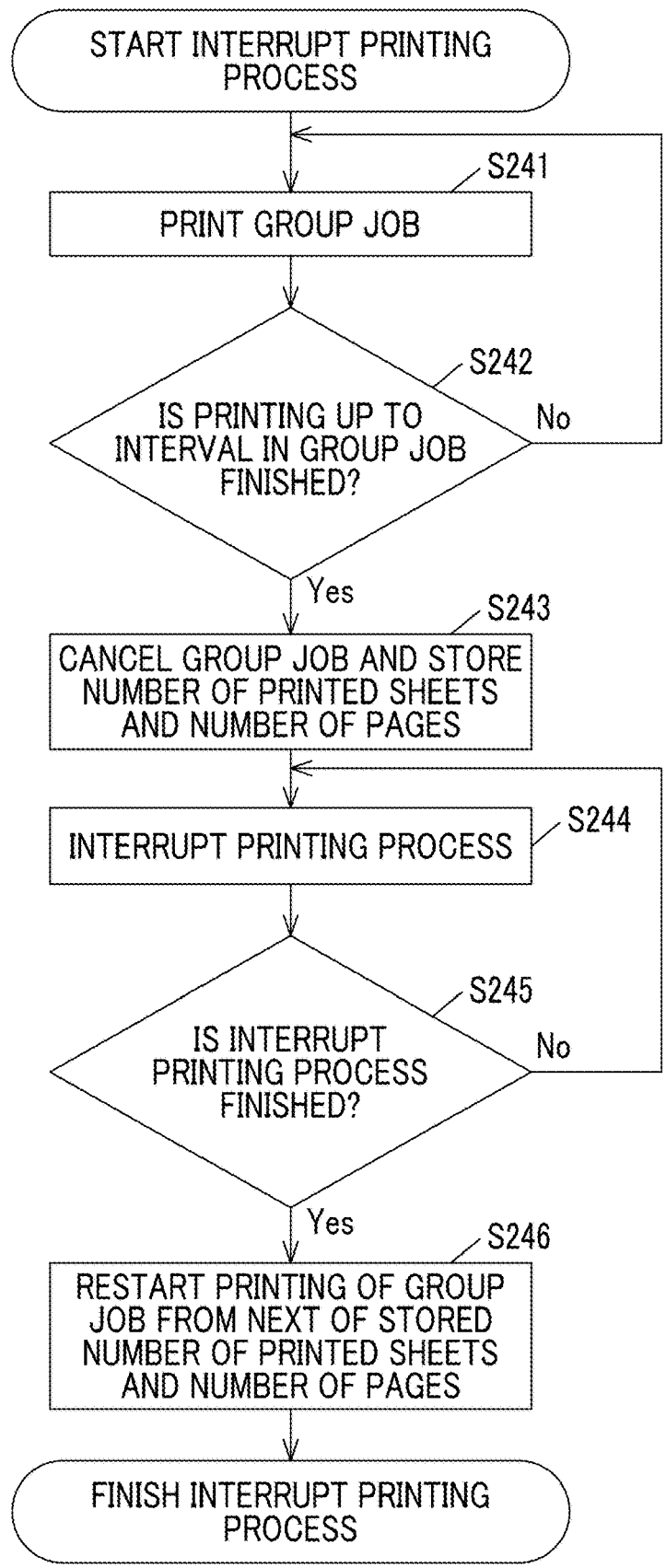
FIG. 8 is a flowchart illustrating the details of step S240 in the flowchart shown in FIG. 5.

FIG. 8 is a flowchart illustrating the details of step S240 shown in FIG. 5.

The executing unit 203 executes a printing job included in the group job (S241). The job control unit 204 determines whether printing up to an interval during the printing job in the group job is finished or not (S242). In a case where the printing up to the interval during the printing job is not finished (S242: No), the executing unit 203 continues the printing job included in the group job (S241).

In a case where the job control unit 204 determines that the printing up to the interval during the printing job is finished (S242: Yes), the job control unit 204 cancels the group job in progress and stores in-process information such as the number of printed sheets in the group job and the number of pages in the group job storing unit 212 (S243).

Next, the executing unit 203 executes the interrupt printing process (S244). In a case where the executing unit 203 finishes the interrupt printing process (S245: Yes), the job control unit 204 reads the in-process information such as the number of printed sheets during the canceled group job and the number of pages from the group job storing unit 212 and the executing unit 203 restarts the printing job included in the group job (S246).

Forcible Interrupt Printing Process (S250)

Figure 9:
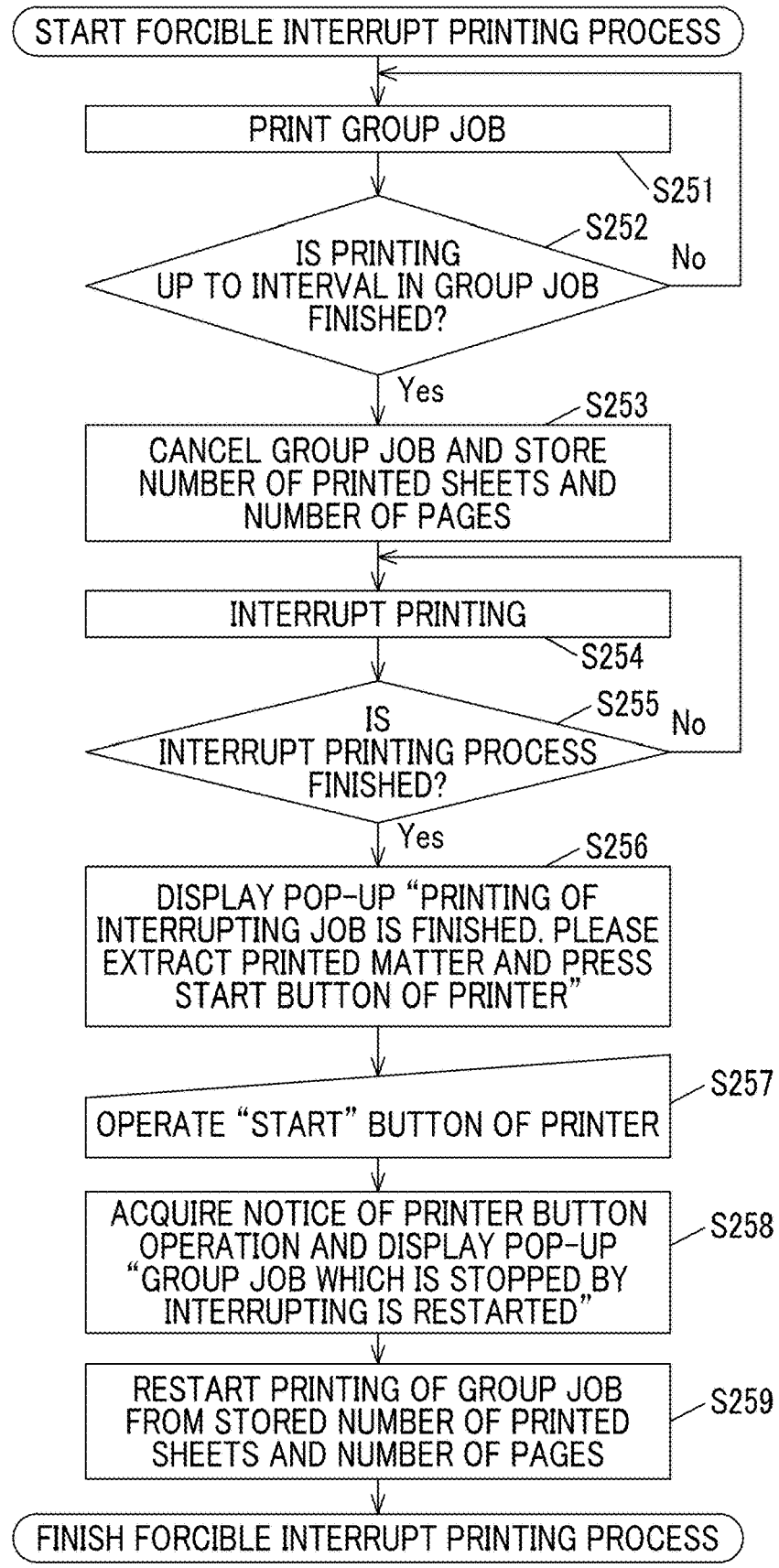
FIG. 9 is a flowchart illustrating the details of step S250 in the flowchart shown in FIG. 5.

FIG. 9 is a flowchart illustrating the details of step S250 in the flowchart shown in FIG. 5.

The executing unit 203 executes a printing job included in the group job (S251). The job control unit 204 determines whether printing up to an interval during the printing job in the group job is finished or not (S252). In a case where the printing up to the interval during the printing job is not finished (S252: No), the executing unit 203 continues the group job (S251).

In a case where the job control unit 204 determines that the printing up to the interval during the printing job is finished (S252: Yes), the job control unit 204 cancels the group job in progress and stores in-process information such as the number of printed sheets in the group job and the number of pages in the group job storing unit 212 (S253).

Next, the executing unit 203 executes the forcible interrupt printing process (S254). In a case where the executing unit 203 finishes the forcible interrupt printing process (S255: Yes), the display control unit 201 reads the pop-up screen 225 (refer to FIG. 4F) from the pop-up screen information 213 and causes the operation display unit 220 to display the pop-up screen 225 (S256).

FIG. 4F is a diagram illustrating an example of the pop-up screen 225 indicating that the forcible interrupt printing process is finished. The pop-up screen 225 includes a "yes" button 225a. In a case where the "yes" button 225a is operated and a "start" button of the printer 2 is operated (S257), the display control unit 201 reads the pop-up screen 226 (refer to FIG. 4G) from the pop-up screen information 213 and causes the operation display unit 220 to display the pop-up screen 226 (S258).

FIG. 4G is a diagram illustrating an example of the pop-up screen 226 indicating that the group job is restarted. The pop-up screen 226 includes a "yes" button 226a. In a case where the "yes" button 226a is operated, the job control unit 204 reads the in-process information such as the number of printed sheets during the canceled group job and the number of pages from the group job storing unit 212 and the executing unit 203 restarts the group job (S259).

Hereinabove, the exemplary embodiment of the present invention has been described. However, the exemplary embodiment of the present invention is not limited to the above-described exemplary embodiment and various modifications and implementations can be made without departing from the spirit of the present invention.

A portion or the entire of each unit of the controlling unit 200 may be configured by using a hardware circuit such as a field programmable gate array (FPGA) and an application specific integrated circuit (ASIC).

In addition, some of constituent elements of the exemplary embodiment can be omitted or modified without departing from the spirit of the present invention.

In addition, addition, deletion, and change of steps in the flow of the exemplary embodiment can be made without departing from the spirit of the present invention. In addition, the program used in the exemplary embodiment may be provided by being recorded in a computer-readable recording medium such as a CD-ROM. In addition, the program used in the exemplary embodiment may be stored in an external server such as a cloud server such that the program is used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a hardware processor that performs control such that a second job for which no deadline is set is executed in a case where the second job is received while a first job for which a deadline is set is being executed and the deadline of the first job is not missed even in a case where the second job is executed,
   wherein the first job includes a printing process and an aftertreatment process as a plurality of processes and performs control such that the second job is executed during a longest interval in a case where intervals are provided between the processes.

2. The information processing apparatus according to claim 1,
   wherein the hardware processor does not execute the second job in a case where the deadline of the first job is missed.

3. The information processing apparatus according to claim 2,
   wherein the hardware processor performs control such that a discharge destination of the second job is changed in a case where a discharge destination of the first job and the discharge destination of the second job are the same as each other.

4. The information processing apparatus according to claim 3,
   wherein the discharge destination of the second job is one of a plurality of discharge destinations which a user more easily handles than the other of the plurality of discharge destinations.

5. The information processing apparatus according to claim 3,
   wherein the hardware processor notifies a user of the changed discharge destination.

6. The information processing apparatus according to claim 4,
   wherein the hardware processor causes the changed discharge destination to be displayed in a display mode different from display modes of other discharge destinations.

7. The information processing apparatus according to claim 1,
   wherein the hardware processor notifies a user of completion of the second job in a case where a discharge destination of the first job and a discharge destination of the second job are the same as each other.

8. The information processing apparatus according to claim 7,
   wherein the hardware processor performs control such that the first job is restarted in a case where extraction of processing result of the second job is detected.

9. The information processing apparatus according to claim 1, wherein the hardware processor does not execute the second job in a case where a discharge destination of the first job and a discharge destination of the second job are the same as each other.

10. The information processing apparatus according to claim 9,
wherein the hardware processor notifies a user that the second job is not executed.

11. The information processing apparatus according to claim 1,
wherein the interval during which the second job is executed is between the printing process and the aftertreatment process.

12. The information processing apparatus according to claim 1,
wherein whether the deadline is missed or not is determined in consideration of a remaining execution time of a process in the first job for which the deadline is set, an execution time of the second job, and a job switching time.

13. A non-transitory computer readable medium storing a program causing a computer to function as:
controlling a second job for which no deadline is set is executed in a case where the second job is received while a first job for which a deadline is set is being executed and the deadline of the first job is not missed even in a case where the second job is executed,
wherein the first job includes a printing process and an aftertreatment process as a plurality of processes and performing control such that the second job is executed during a longest interval in a case where intervals are provided between the processes.

14. An information processing method comprising:
controlling a second job for which no deadline is set is executed in a case where the second job is received while a first job for which a deadline is set is being executed and the deadline of the first job is not missed even in a case where the second job is executed,
wherein the first job includes a printing process and an aftertreatment process as a plurality of processes and performing control such that the second job is executed during a longest interval in a case where intervals are provided between the processes.

* * * * *